United States Patent [19]

Price

[11] 4,377,027
[45] Mar. 22, 1983

[54] FISHLINE SINKER APPLICATOR

[76] Inventor: Thomas J. Price, Rte. 1, Lynchburg, Tenn. 37352

[21] Appl. No.: 174,677

[22] Filed: Aug. 1, 1980

[51] Int. Cl.³ .................. B23P 19/00; B23Q 7/10; B11D 9/00
[52] U.S. Cl. .................. 29/566.1; 29/817; 43/44.89; 72/410
[58] Field of Search .............. 29/566.1, 564.6, 566.4, 29/817; 43/44.89; 72/409, 410

[56] References Cited

U.S. PATENT DOCUMENTS

| | | | |
|---|---|---|---|
| 2,765,686 | 10/1956 | Deline | 43/44.89 X |
| 2,829,550 | 4/1958 | Hamshaw | 29/566.1 |
| 2,837,950 | 6/1958 | Hardy | 72/409 |
| 2,941,431 | 6/1960 | Christenson et al. | 29/566.1 |
| 3,003,376 | 10/1961 | Macy et al. | 72/410 |
| 3,023,416 | 3/1962 | Ytreland | 72/410 |
| 3,371,400 | 3/1968 | Edes | 72/410 X |
| 3,583,202 | 6/1971 | Blakeway | 72/410 |
| 3,664,006 | 5/1972 | Valle | 29/817 X |
| 3,914,976 | 10/1975 | Karr | 29/817 X |

FOREIGN PATENT DOCUMENTS 1581750 12/1980 United Kingdom ............... 43/44.89

Primary Examiner—William R. Briggs
Attorney, Agent, or Firm—C. A. Phillips

[57] ABSTRACT

A fishing sinker applicator assembly wherein a plurality of sinkers are connected by a sprue, in line, and each being generally semi-circular with a top V-shaped groove. Selectively, and one at a time, the combination of a cutter-hammer and anvil of the applicator simultaneously sever the sprue and compress a fishing line within a groove to thus apply an individual sinker to a fishing line.

5 Claims, 11 Drawing Figures

FISHLINE SINKER APPLICATOR

TECHNICAL FIELD

This invention relates to a device for attaching small "split-shot" type sinkers or weights to fishing lines and to cartridges or sticks of such shot.

BACKGROUND ART

Fishing, whether with elaborate rods and reels or simple can pole and line, is both an exciting, enjoyable sport and a pleasant pasttime. However, it is not without its minor annoyances. One of these is the task of attaching small split-shot sinkers to the fishing line. This may be required several times in the course of one day's fishing. The sinkers are typically packages loosely in a small plastic box with a sliding lid. The small weights, generally about ¼ inch in diameter, are difficult to remove from the box or hold onto because of their small size. Spilling the entire contents of the box is not an uncommon occurrence. The sinker must then be held in place on the fishing line with one hand, the fishing line placed completely into the split with the other hand, and then with a third hand (of which most fishermen only have two), the sinker is crimped or squeezed with a pair of needle nose pliers to hold it tightly on the fishing line.

STATEMENT OF INVENTION

One object of this invention is to provide a simple, convenient and automatic means of attaching or applying split-shot sinkers to fishing line.

Another object of this invention is to provide storage from which the fisherman will not have to retrieve the sinkers with his fingers, thus risking spilling the remaining sinkers.

Another object of this invention is to provide a split-shot sinker handling device or applicator which will accommodate sinkers which are cast in sticks with a small diameter sprue connecting individual sinkers.

Another object of this invention is to provide a stick of split-shot sinkers to use with a device which will attach them to a fishing line and automatically separate them from the remainder of the stock.

A further object of this invention is to provide sinkers in a form more easily used by fishermen who do not use an automatic attaching device.

Other objects and advantages of the invention will be apparent from the following description, taken in connection with the drawings.

BRIEF DESCRIPTION OF THE DRAWINGS

FIG. 2b is a partial perspective view of the basic mechanism of this invention as otherwise illustrated in FIG. 2a.

BEST MODE FOR CARRYING OUT THE INVENTION

Figure 1:
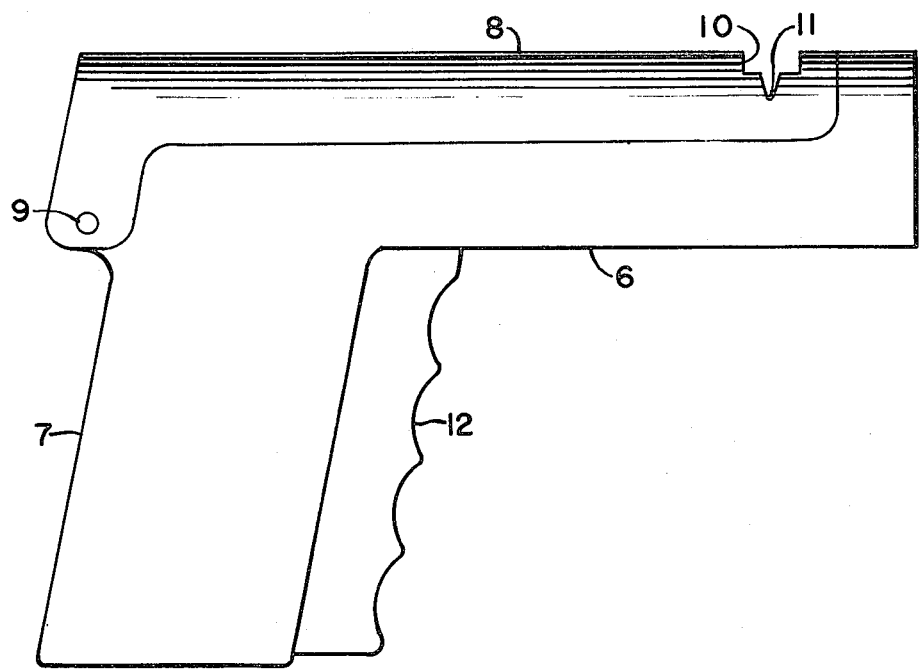
FIG. 1 is an external side view of one embodiment of the invention which has the basic shape of a handgun with a notched opening on the top near the end of the barrel into which the fishing line is placed and a trigger for crimping the split-shot sinker to the line.
Figure 2A:
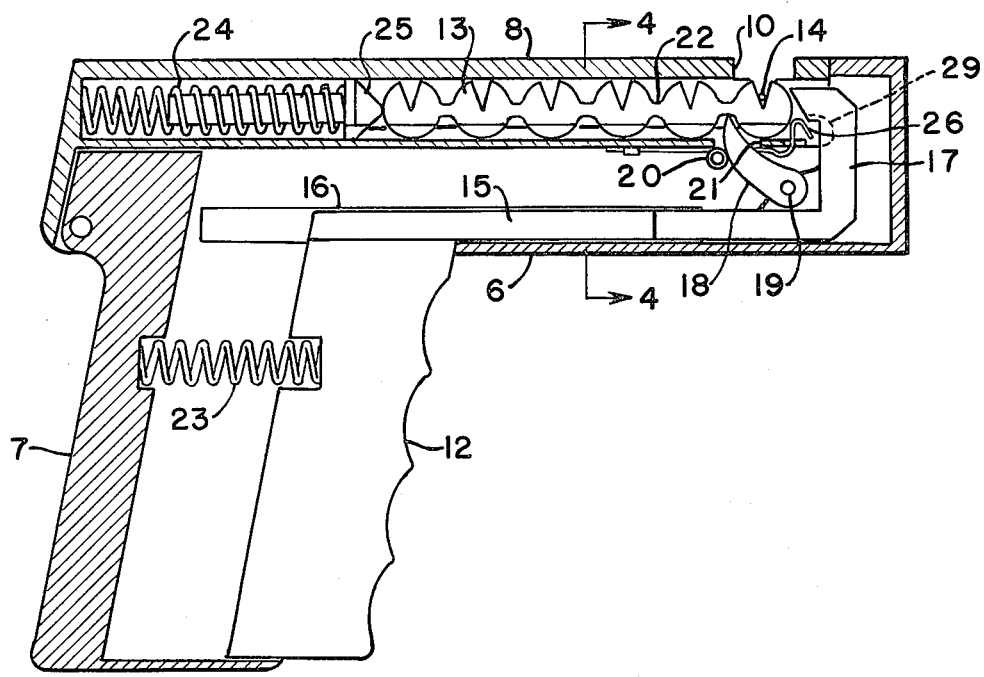
FIG. 2a is a longitudinal cross sectional view of the device showing the relative positions of internal components needed for its operation and containing a stick of sinkers.
Figure 2B:
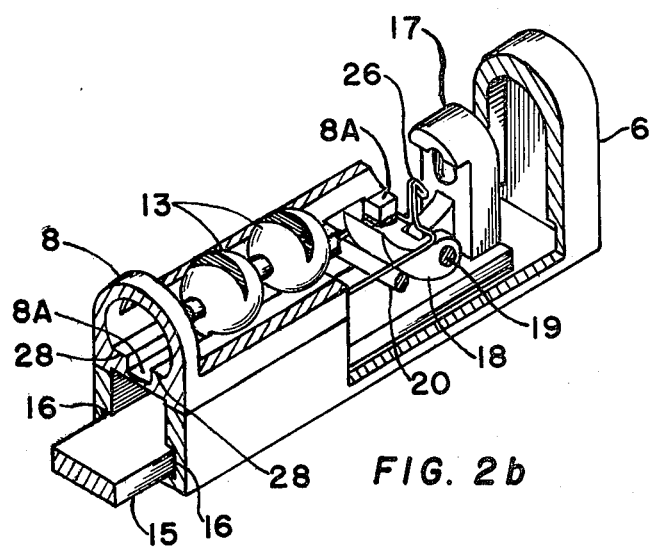

Referring initially to FIGS. 1-4, the numeral 6 designates the frame of sinker applicator 4 which is in the general shape of a handgun with a pistol-grip type handle 7. Barrel 8 is attached to the frame and pivots at pin 9 for movement in a counterclockwise direction for inserting sinker sticks shown in FIGS. 6 and 7. This movement is enabled by the normal resting position of hammer 17 (shown in FIG. 2) wherein barrel 8 can clear hammer 17 as the barrel is tilted above the upper side 6a of frame 6.

After insertion of a shot stick 30 (FIG. 6), barrel 8 is returned to the position shown, whereby the frictional effect of pin 9, or by other means not shown, barrel 8 is retained in this position.

Near the end of the barrel is an opening 10 through which sinkers 13 are removed from the applicator after being attached to fishing line 14. At the bottom of opening 10 is a V-shaped notch 11 into which the fishing line is placed. Large trigger 12 activates the device. Attached atop the trigger, or integral therewith, is a rectangular shaft 15 which travels in slots 16, which are located in both sides of frame 6. At the forward end of shaft 15 is attached a hammer or compressor 17, behind which is a combination cutter/anvil 18 which pivots on shaft 19.

Figure 3:
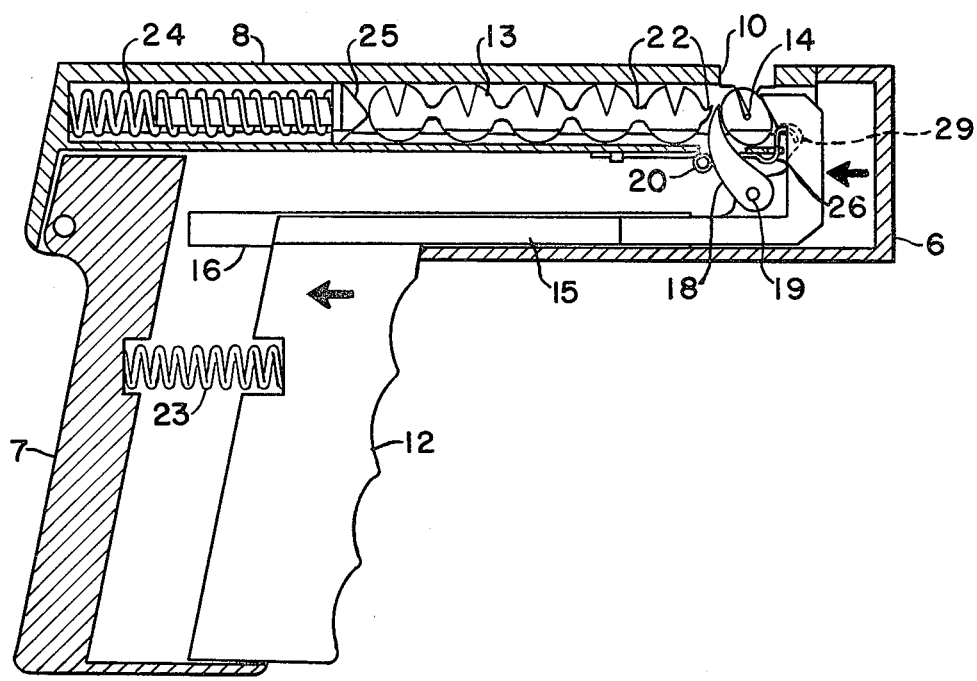
FIG. 3 is a longitudinal cross sectional view of the invention in which one of the sinkers has been crimped onto the fishing line, cut from the stick, and is ready for removal from the device.
Figure 4:
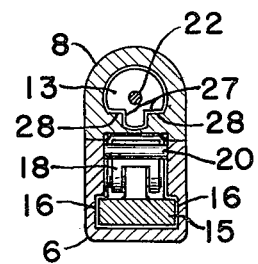
FIG. 4 is a cross sectional view taken along section lines 4—4 of FIG. 2a showing the configuration of the sinker stick when viewed from the end and the manner in which the trigger-to-hammer linkage fits inside the frame of the device.

As trigger 12 is squeezed, hammer 17 travels toward the first (adjacent) split-shot 13, which is directly under opening 10, and into which fishing line 14 has been placed. This movement of trigger 12, shaft 15, and hammer 17 causes cutter/anvil 18 to ride upward on pin 20 and through opening 21 in the bottom of barrel 8. Pin 20 rotates freely on support shaft 20a (by means not shown) to minimize friction between it and cutter/anvil 18. The situation just described is illustrated in FIG. 3. As the trigger is squeezed further in the direction of the arrows in FIG. 3, cutter 18 moves further upward, cutting thin sprue 22 between the first and second sinkers. Cutter 18 then serves as an anvil against which hammer 17 compresses the sinker tightly to fishing line 14.

As pressure on trigger 12 is released, return spring 23, located behind the trigger, moves trigger 12, shaft 15 and hammer 17 fully forward (to the right) in frame 6, and cutter/anvil 18 retracts to a position below the inner surface 8a of barrel 8. This action frees sinker 13, which has been attached to fishing line 14. By lifting fishing line 14, which had previously been laid in notch 11, the sinker now attached to line 14 is removed from the applicator.

The remaining sinkers 13 are moved forward by spring 24 and follower 25 until the first one in line contacts small retaining spring 26 (mounted on barrel 8 by a rivet or other means not shown), which positions the first sinker so that its V slot 31 is in line with notch 11 in barrel 8. Retaining spring 26 also holds the stick of sinkers 22 in place after loading barrel 8 while the barrel is lowered back into frame 6.

A recess 29 has been cut in the center region of hammer 17 to allow it to clear retaining spring 26 as the sinker is crimped.

To prevent rotation of the sinkers around their longitudinal axis, which would cause misalignment of the split in the sinker and notch 11, the sinkers have two notches 27 (FIG. 4) which conform to the shape of corresponding ridges 28 in the lower part of barrel 8. Follower 25 is notched in the same manner and is tapered to a point which permits cutter 18 to pass between it and the last sinker.

Figure 5:
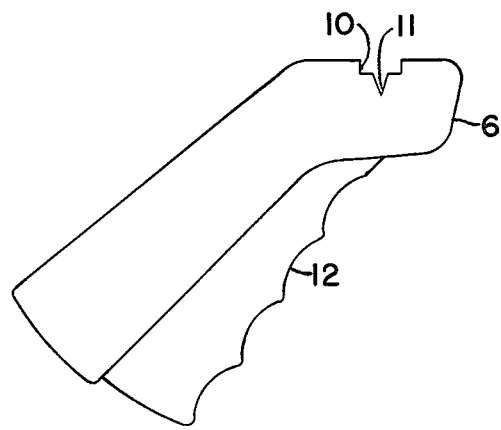
FIG. 5 is a partial side view of another embodiment of this invention which would be smaller and more compact. It would require minor changes in internal linkages, etc., but would operate in the same manner as the device shown in FIGS. 1-4 and would not depart from the scope of the original invention.

As previously stated, the embodiment of the invention shown in FIG. 5 requires a modification of the internal linkages but functions in the same manner as described. In this instance, the barrel would be internal to the frame and would be slightly curved. However, the soft lead from which the sinkers are moulded would bend at the small sprue between individual sinkers so that they would follow the curvature of the barrel without difficulty. Follower 25 and spring 24 would be inserted from the rear, behind the sinkers, as in loading some staple guns.

Another embodiment of the device envisioned by the inventor would resemble the basic model shown in the drawings but would have two barrels to accommodate different sizes, or weights, of sinkers. This would only require using two shafts 15 which would be attached to trigger 12 by a movable latch controlled by a selector on the trigger.

Still another version would incorporate a cylinder containing four or more barrels which would permit carrying a larger selection of sinkers in one device.

Figure 6:
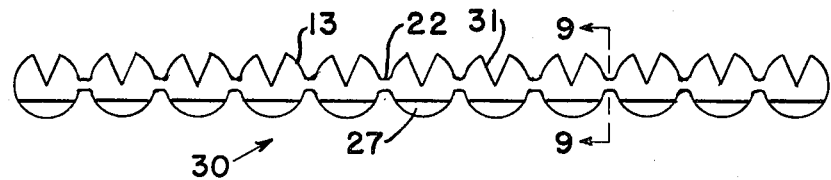
FIG. 6 is a side view of a stick of split-shot sinkers attached to one another by means of a small sprue or connecting link. The entire stick is moulded in one piece from soft lead.
Figure 9:
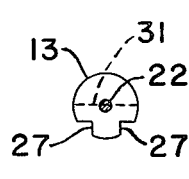
FIG. 9 is a cross sectional view taken along lines 9—9 of FIG. 6.

Referring to FIGS. 6 and 9, the sinker stick as contemplated by this invention is generally indicated by the numeral 30. It consists of several split-shot sinkers 13 which are attached to each other by means of a small sprue or connecting link 22. The V slots 31 of the sinkers are all oriented from side to side of sinker stick 30 in order to allow for proper operation of the sinker applicator. A plane bisecting the V would be approximately normal to a central line extending longitudinally through the stick. A longitudinal notch 27 in the lower part of sinkers 13 runs the entire length of the stick on both sides to prevent rotation of the sinker stick device.

Figure 7:
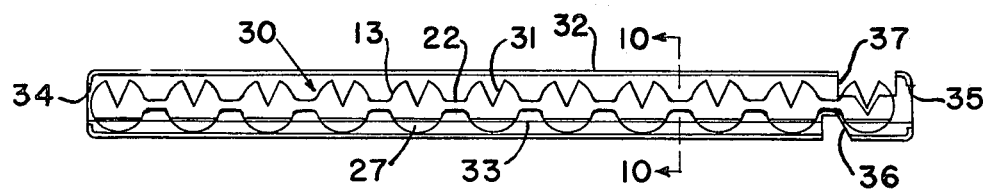
FIG. 7 is a side view of the sinker stick of FIG. 6 packaged in a clear plastic tubing.
Figure 10:
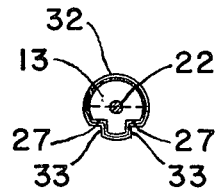
FIG. 10 is a cross sectional view taken along lines 10—10 of FIG. 7.

The sinker stick shown in FIGS. 7 and 10, identical in configuration to the one shown in FIG. 6, has been packaged in a clear plastic tubing 32 whose outside diameter is the same as the largest sinkers used in the sinker stick device. This permits using one automatic crimping device with various sizes, or weights, of sinkers, varying only the thickness of the tubing to mate with the sizing of barrel 8. The connecting sprue of smaller sinkers would be slightly longer to maintain the same spacing as a larger one. Tubing 32 has a longitudinal notch 33 on each side which corresponds to notch 27 of the sinkers and fits into mating guides in the sinker stick device. Tubing 32 has an opening 34 at the left end of the drawing in FIG. 7 which permits entrance of a spring 24 and follower 25 in the sinker stick. Opening 35 at the right end of tubing 32 in the drawing is for hammer 17 (or compressor) which crimps the first sinker of the stick. Slot 36 in the bottom of plastic tubing 32 provides space for cutter 18 of the sinker stick to enter the tubing to cut sinker 13, after which sinker 13 is removed through opening 37 in the top of tubing 32.

Figure 8:
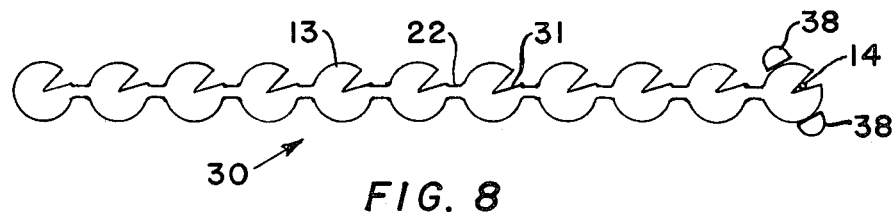
FIG. 8 is a modification of a sinker stick particularly adapted to be used with needle nose pliers as one would normally attach individual sinkers, but with the connecting links to facilitate handling and prevent spillage or loss.

Sinker stick 30, shown in FIG. 8, is a modification of the one shown in FIGS. 6 and 7 and is intended for use with needle nose pliers, which are normally used for crimping individual split-shot sinkers. V slot 131 is tilted to permit easy crimping of the first sinker 113. Tips 138 of a pair of needle nose pliers are shown in position to crimp the sinker on fishing line 14. After crimping the sinker, it is cut loose with the cutters, which are incorporated in most pliers, or it can simply be twisted off by hand since sprue 22 is made of soft lead.

I claim:

1. A fishline sinker applicator comprising:
   an elongated sinker assembly comprising a plurality of generally upper located semi-spherical sinkers having upper positioned and aligned V-shaped slots having surfaces, each slot being configured by the absence of a segment of the spherical shape of a sinker, and the sinkers being serially interconnected by a lower located narrow connecting sprue;
   a frame;
   a barrel assembly supported by said frame and including a barrel sized to receive said sinker assembly within said barrel, and including:
     a first opening in one end,
     a second opening in one side of the barrel adjacent to said one end, and
     a third opening in a side of said barrel generally opposite to the side having said second opening and also being adjacent to said one end;
   spring means for urging said sinker assembly toward said one end;
   operating means mounted on said frame and movable in response to the application of an external force, and including first and second force members operably connected together and extending, respectively, through said first and third openings for contacting a said sinker and sprue, and upon movement of said force members against a sinker for crimping said surfaces about a fishing line and severing the sprue and thus separating a severed sinker from said sinker assembly;
   said severed sinker being thus positioned to be removed from said barrel through said second opening.

2. A fishline sinker applicator as set forth in claim 1 wherein said operating means includes a movable carriage, and said first force member comprises a hammer movable longitudinally in a direction corresponding to the longitudinal axis of said barrel against a said sinker responsive to movement of said carriage, and said hammer having a tapered surface configured to close a said slot of said sinker upon said carriage being moved longitudinally in a discrete direction.

3. A fishline sinker applicator asset forth in claim 2 wherein said second force member comprises an anvil member pivotally mounted on said carriage and movable inward into said barrel against a said sprue and applying a force to a said sinker counter to that provided by said hammer as said carriage is moved in said discrete direction.

4. A fishline sinker applicator as set forth in claim 3 wherein said frame includes:
   guide means for guiding said carriage for movement along a line of direction including said discrete direction; and
   spring means interconnecting said carriage and said frame for biasing said carriage in a direction along said line of direction opposite to said discrete direction, whereby said anvil is normally biased to be separated from a said sinker.

5. A fishline sinker applicator as set forth in claim 4 generally configured as an automatic pistol, and wherein:
   said barrel is oriented in a pistol barrel position;
   a handle is included, and it is oriented in a pistol handle position; and
   a trigger member is included, and it is positioned in a generally trigger position of a pistol adjacent to said handle, and said trigger being connected to said carriage;
   whereby, by the application of a gripping force around said triggering handle, said carriage is operated in a said discrete direction.

* * * * *